United States Patent Office 2,888,367
Patented May 26, 1959

2,888,367

PROCESS FOR PROMOTING ADHESION TO DIFFICULTLY WETTABLE POLYMER SURFACE

William L. Greyson, Halesite, N.Y., assignor to Hitemp Wires, Inc., Westbury, N.Y., a corporation of New York No Drawing. Application February 14, 1958
Serial No. 715,187

13 Claims. (Cl. 117—138.8)

The present invention relates to the activation of passive, i.e. difficultly wettable, polymer surfaces and, more particularly, to a method for promoting adhesion of varnishes, resins, potting compounds and the like to such surfaces. The process of the present invention is especially suitable for the treatment of wires coated with a passive polymer.

This application is a continuation-in-part of copending application Serial No. 696,593, filed on November 13, 1957, by William L. Greyson and now abandoned.

There are many types of polymers which have surfaces not wettable by either oils or water. Prominent among these are the polyhalocarbon resins, for example polytetrafluoroethylene (Teflon TFE), a copolymer of tetrafluoroethylene with hexafluoropropylene (Teflon FEP), and polytrifluoromonochloroethylene (Kel-F or Flurothene). Other polymers having difficultly wettable surfaces include polyethylene and polypropylene. The process of the present invention is applicable to all such difficultly wettable polymer surfaces.

A surface of a passive polymer is not wettable by either oils or water to permit adequate bonding to another surface of the same material or to the surfaces of other materials. Yet such polymers are desirable in many instances as, for example, dielectric coating for electrical conductors. Polytetrafluoroethylene is particularly desirable because of its insulating characteristics both at low temperatures and at high temperatures. In addition, polytetrafluoroethylene is highly resistant to the corrosion effects of most materials.

The use of passive polymers such as polytetrafluoroethylene for insulation of electrical conductors would be enhanced if they could be made receptive to dyes, inks and adhesives. For example, insulated wire for the construction of coils, transformers, motors, hook-up wire, and other electrical components, or the like are often embedded in resins or other potting or adhesive materials for protection or rigidity. Also, inks must be employed on wire insulation for identification purposes.

In the past, various methods different from that of the present invention have been used to activate passive polymer surfaces. Sand blasting has been used to activate polyethylene surfaces. It has been suggested that polyhalocarbon resin surfaces can be made receptive to the various types of resins and adhesive materials by etching with sodium or similar active metals. (See U.S. Patent 2,789,063). However, where a polyhalocarbon surface is very thin, for example on small sizes of magnet wire, the coating is damaged by such an etching action, and its usefulness as an insulation is greatly impaired.

It is an object of this invention to provide a method of treating a passive polymer surface such as polytetrafluoroethylene so that potting compounds, varnishes, inks, dyes and the like will wet and adhere thereto.

A further object of the invention is to provide a method of rendering a thin passive polymer surface wettable without degradation of the surface as electrical insulation.

Generally, the present invention provides a method of treating a passive polymer surface to render it susceptible to adhesion with potting compounds, dyes, varnishes, inks and the like such that the surface is uniquely adaptable as insulation for electrical conductors. However, it is understood that the invention is not limited to that use, it being equally adaptable to other articles made of such material.

In the following discussion, polytetrafluoroethylene has been chosen for the sake of convenience to illustrate the present invention. It is to be understood, however, that the invention is also applicable to passive polymers other than polytetrafluoroethylene.

According to the present invention, a polymer formed from an alkyl or alkoxyalkyl titanate and incorporating a perfluorinated carbon side chain is applied to the polytetrafluoroethylene surface. An alkyl or alkoxyalkyl titanate is first polymerized, the addition of water starting the reaction. Some of the side chains of the polymer are then replaced by perfluorinated side chains. Useful alkyl titanates include such materials as tetrapropyl titanate and tetrabutyl titanate. The useful alkoxyalkyl titanates include such materials as tetramethoxymethyl titanate and tetraethoxyethyl titanate and the like. A particularly useful source of perfluorinated side chains is the compound perfluorooctanoic acid. For example, tetrabutyl titanate, in an inert organic water miscible solvent, polymerizes upon the adidtion of water. Some of the butyl side chains of the polymer are then replaced by the perfluorinated side chain from perfluorooctanoic acid. The resulting polymer, in which perfluorinated side chains have been incorporated, adheres in the form of a film to the treated polytetrafluoroethylene surface. Some titanium dioxide is also probably present in the film.

In place of perfluorooctanoic acid, other sources of perfluorinated side chains can be used, for example the "Teflon Alcohols," 1,1,5-trihydroperfluoropentyl alcohol, 1,1,7-trihydroperfluoroheptyl alcohol, and 1,1,9-trihydroperfluorononyl alcohol.

The stability of the adhesion promoting polymer can be increased so that storage for a number of days is possible, by incorporating into the polymer a bifunctional cross-linking agent. A preferred example of a bi-functional cross-linking agent is triethylene glycol. The use of such a cross-linking agent, while advantageous, is optional, and not essential to the practice of the invention. Other useful cross-linking agents include resorcinol, phthalic anhydride, Carbowax 1500 (a polyethylene glycol resin having a molecular weight of 1500) and methyl nadic anhydride.

In general, it is preferred to use approximately 2 moles of alkyl titanate to 1 mole of polyfluorinated compound which supplies the polyfluorinated side chains. About 0.25 mole of the cross-linking agent is generally best employed for each mole of the titanate monomer. The adhesion promoting polymer is applied to the wire or other surface to be treated by contacting the surface with a solution of the polymer in an organic solvent. Ethylene glycol ethyl ether (Cellosolve) is a particularly good solvent, especially when used in an approximately 80 to 20 mixture with naphtha.

The following examples are given solely for purposes of illustration and are not to be considered as limiting the invention to these embodiments. Many modifications will be apparent to those skilled in the art without departing from the spirit or scope of the invention.

*Example 1*

A wire having a coating of polytetrafluoroethylene was passed through a bath containing 3% of an adhesion promoter in a solvent consisting of 80% ethylene glycol ethyl ether and 20% naphtha. The adhesion promoter was prepared as follows:

|  | Mole | Gms. |
|---|---|---|
| Tetrapropyl titanate | 1 | 284 |
| Water | 1 | 18 |
| Triethylene glycol | 0.25 | 37.5 |
| Perfluorooctanoic acid | 0.50 | 207 |
| "Cellosolve" (ethylene glycol ethyl ether) | 1 | 90 |

Tetrapropyl titanate and "Cellosolve" were mixed together. Water and triethylene glycol were mixed together, and this solution was added slowly while agitating to the tetrapropyl titanate-"Cellosolve" solution, which was distilled until all the resulting isopropyl alcohol was removed. After cooling, the perfluorooctanoic acid was added. With heat and agitation, an equivalent quantity of isopropyl alcohol was removed. In this last distillation, additional "Cellosolve" was added to prevent the polymer from becoming excessively gummy.

The wire was passed through the bath at the rate of about 20 feet per minute, and was then subjected to a stream of moving air at room temperature for about one minute, until the solvent was evaporated and the adhesion promoting polymer had formed a film on the surface of the polytetrafluoroethylene. This film was so thin that it was not visible or measurable, but was evidenced by subsequent behavior only.

Next, the treated wire was passed through a puddle of a thin coating material. Coating materials used included an aqueous dispersion of an acrylic resin (du Pont's "Lecton"), and a solvent solution of a silicone resin (Dow Corning's "No. 997"). The coated wire was then passed through an oven at approximately 600° F. at a speed of approximately 20 feet per minute. As the wire emerged from this heating zone, the film was substantially dry.

To test the adhesive effectiveness of a varnish coating applied to the polytetrafluoroethylene coated wire treated as described above, a quantity of the wire was potted in epoxy resin, and the force required to pull the wire from the resin was measured. Of course, it is recognized that untreated polytetrafluoroethylene coated wire can be removed from an epoxy resin potting compound with ease. However, a wire treated and potted as described above required a tension of 6-9 pounds to pull it free from the resin.

Coatings of various materials such as silicone resin, epoxy resins, or acrylic resins, from aqueous or organic solvent media, applied directly to a polytetrafluoroethylene surface, can be removed easily with a fingernail. However, when the polytetrafluoroethylene surface has been first treated according to the method of the invention, a surface coating cannot be removed by fingernail scraping, but instead adheres firmly.

*Example 2*

When used in place of the polyfluoroethylene of Example 1, surfaces of Teflon FEP, of polytrifluoromonochloroethylene, of polyethylene and of polypropylene were also activated and made to adhere to potting compounds, dyes, varnishes and the like by the processes described in Example 1.

What is claimed is:

1. A process for promoting adhesion to a polymer surface which resists wetting both by water and by oils which comprises applying to the surface a polymer formed by the incorporation of perfluorinated side chains from a compound selected from the group consisting of perfluorooctanoic acid, 1,1,5-trihydroperfluoropentyl alcohol, 1,1,7-trihydroperfluoroheptyl alcohol and 1,1,9-trihydroperfluorononyl alcohol into a polymer formed by the reaction with water of a compound selected from the group consisting of short chain alkyl titanates and short chain alkoxyalkyl titanates.

2. A process for promoting adhesion to a polymer surface which resists wetting both by water and by oils which comprises applying to the surface a polymer formed from perfluorooctanoic acid and from a polymer formed by the reaction with water of a compound selected from the group consisting of short chain alkyl titanates and short chain alkoxyalkyl titanates.

3. A process for promoting adhesion to a polyhalocarbon resin surface which comprises applying to the surface a polymer formed by the incorporation of perfluorinated side chains from a compound selected from the group consisting of perfluorooctanoic acid, 1,1,5-trihydroperfluoropentyl alcohol, 1,1,7-trihydroperfluoroheptyl alcohol and 1,1,9-trihydroperfluorononyl alcohol into a polymer formed by reaction with water of a compound selected from the group consisting of short chain alkyl titanates and short chain alkoxyalkyl titanates.

4. A process for promoting adhesion to a polyhalocarbon resin surface which comprises applying to the surface a polymer formed from perfluorooctanoic acid and from a polymer formed by the reaction with water of a compound selected from the group consisting of short chain alkyl titanates and short chain alkoxyalkyl titanates.

5. A process for promoting adhesion to a polytetrafluoroethylene surface which comprises applying to the surface a polymer formed by the incorporation of perfluorinated side chains from a compound selected from the group consisting of perfluorooctanoic acid, 1,1,5-trihydroperfluoropentyl alcohol, 1,1,7-trihydroperfluoroheptyl alcohol and 1,1,9-trihydroperfluorononyl alcohol into a polymer formed by the reaction with water of a compound selected from the group consisting of short chain alkyl titanates and short chain alkoxyalkyl titanates.

6. A process for promoting adhesion to a polytetrafluoroethylene surface which comprises applying to the surface a polymer formed from perfluorooctanoic acid and from a polymer formed by the reaction with water of a compound selected from the group consisting of short chain alkyl titanates and short chain alkoxyalkyl titanates.

7. A process as claimed in claim 6 in which the polymer is formed from the titanate and perfluorooctanoic acid in the molar ratio of about 2 to 1.

8. A process as claimed in claim 5 in which a cross-linking bi-functional monomer is also incorporated into the polymer.

9. A process as claimed in claim 5 in which triethylene glycol is used as a cross-linking agent.

10. A process for promoting adhesion to a polytetrafluoroethylene surface which comprises applying to the surface a polymer formed from tetrapropyl titanate by reaction with water and perfluorooctanoic acid.

11. A process for promoting adhesion to a polytetrafluoroethylene surface which comprises applying to the surface a polymer formed from tetrabutyl titanate by reaction with water and perfluorooctanoic acid.

12. A process for promoting adhesion to a polytetrafluoroethylene surface which comprises applying to the surface a polymer formed from tetrapropyl titanate by reaction with water, perfluorooctanoic acid and triethylene glycol.

13. A process for promoting adhesion to a polytetrafluoroethylene surface which comprises applying to the surface a polymer formed from tetrabutyl titanate by reaction with water, perfluorooctanoic acid and triethylene glycol.

References Cited in the file of this patent

UNITED STATES PATENTS

| 2,689,805 | Croze | Sept. 21, 1954 |
| 2,750,303 | La Berge | June 12, 1956 |
| 2,773,781 | Rodman | Dec. 11, 1956 |
| 2,809,130 | Rappaport | Oct. 8, 1957 |